United States Patent
Neurauter et al.

(10) Patent No.: US 7,831,224 B2
(45) Date of Patent: Nov. 9, 2010

(54) RADIO-FREQUENCY IC FOR A MOBILE RADIO TRANSMITTER

(75) Inventors: Burkhard Neurauter, Linz (AT); Guenter Maerzinger, Linz (AT); Clemens Troebinger, Pregarten (AT); Thorsten Tracht, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1231 days.

(21) Appl. No.: 11/380,549

(22) Filed: Apr. 27, 2006

(65) Prior Publication Data
US 2006/0258307 A1 Nov. 16, 2006

(30) Foreign Application Priority Data
Apr. 29, 2005 (DE) .................. 10 2005 020 116

(51) Int. Cl.
*H04B 1/04* (2006.01)
(52) U.S. Cl. .................. 455/118; 455/324; 455/333; 375/302
(58) Field of Classification Search ......... 455/108–112, 455/118, 313, 323, 324, 333; 375/300–303, 375/320–324, 326
See application file for complete search history.

(56) References Cited

U.S. PATENT DOCUMENTS

| 2004/0037373 A1* | 2/2004 | Ashley et al. ............... 375/341 |
| 2004/0146122 A1* | 7/2004 | Fague et al. ................. 375/326 |
| 2006/0104383 A1* | 5/2006 | Jensen ........................ 375/295 |

FOREIGN PATENT DOCUMENTS

WO   WO 2004/034667 A2   4/2004

OTHER PUBLICATIONS

GSM; 3rd Generation Partnership Project, Technical Specification Group GSM/EDGE Radio Access Network, Modulation Release 5; 3GPP TS 45.004 V5.1.1, Sep. 2003.

* cited by examiner

*Primary Examiner*—Nhan Le
(74) *Attorney, Agent, or Firm*—Edell, Shapiro & Finnan, LLC

(57) ABSTRACT

A radio-frequency IC (3) for a mobile radio transmitter (1) has an analogue/digital converter unit (5) for digitizing baseband signals (AB), a recovery unit (6, 7, 8, 9, 10) for recovering determined data information (Rot, TxSymbPhase) on which the baseband signals (AB) are based, a digital/analogue converter unit (11) and a frequency converter unit for producing transmitted signals on the basis of the signals produced by the digital/analogue converter unit (11).

15 Claims, 2 Drawing Sheets

RADIO-FREQUENCY IC FOR A MOBILE RADIO TRANSMITTER

PRIORITY

This application claims priority from German Patent Application No. DE 10 2005 020 116.4, which was filed on Apr. 29, 2005, and is incorporated herein by reference in its entirety.

TECHNICAL FIELD

The invention relates to a radio-frequency IC which is provided in a mobile radio transmitter and which receives analogue baseband signals from a baseband IC and uses these baseband signals to produce transmitted signals.

BACKGROUND

Generally, analogue signals which are transmitted via an interface between two monolithically integrated circuits (subsequently called ICs) are particularly susceptible to interference from external noise signals. This applies in equal measure to the interface between the baseband IC and the radio-frequency IC of the mobile radio transmitter too. This interface is used to transmit analogue baseband signals which have already been modulated and pulse-shaped, in order to be mixed onto the transmission frequency by the radio-frequency IC and then transmitted to the mobile radio receiver via the radio channel. The quality of the signals received by the mobile radio receiver is consequently impaired not only by the distortions caused by the channel transmission but also by interference which is induced into the analogue baseband signals in the actual mobile radio receiver on account of said interface. Ultimately, this makes it more difficult to reconstruct the original transmitted data in the mobile radio receiver.

One way of solving this problem is a digital interface between the baseband IC and the radio-frequency IC. However, this has the drawback that standard interfaces, which are currently always of analogue design, can no longer be used. Accordingly, if an analogue interface is to be retained, a high-quality and complex signal processing chain needs to be implemented in the radio-frequency IC in order to eliminate the interference caused by the analogue interface from the baseband signals.

SUMMARY

The object of the invention is therefore to provide a radio-frequency IC for a mobile radio transmitter which accepts analogue baseband signals and which uses low-complexity postprocessing to eliminate the interference caused by the analogue interface from the baseband signals. The aim is also to provide a mobile radio transmitter which contains the inventive radio-frequency IC.

A radio-frequency IC based on the invention is implemented in a mobile radio transmitter. The inventive radio-frequency IC has an input which is used to supply the radio-frequency IC with analogue baseband signals from a baseband IC. Downstream of this input of the radio-frequency IC, the transmitted signal path contains an analogue/digital converter unit, a recovery unit and a unit for producing analogue transmitted signals from the determined data information, connected in the stated order.

The analogue/digital converter unit is used for digitizing the analogue and modulated baseband signals accepted at the input of the radio-frequency IC. The digital baseband signals are supplied to the recovery unit, which uses these signals to obtain data information forming the basis of the analogue baseband signals. A particular distinctive feature of this data information is that it is determined data information. In this case, however, it is not necessary to provide for reconstruction of the bits or symbols from which the analogue baseband signals are produced. By way of example, in phase modulation the phase values are already determined data information.

The data information produced by the recovery unit is converted into analogue signals by the unit for producing analogue transmitted signals. To this end, by way of example, the data information can first of all be processed further and then converted into analogue transmitted signals. In particular, the unit which is used to produce the transmitted signals may comprise an extremely digital modulator.

The inventive recovery unit affords the advantage that it can reconstruct the information on which the analogue baseband signals are based in the manner in which they were in the baseband IC. Consequently, the interference caused by the transmission from the baseband IC to the radio-frequency IC can be eliminated from the data by the recovery unit, so that this interference is ultimately no longer of any significance during the later reconstruction of the transmitted data in the radio receiver. Since the complexity for implementing the analogue/digital converter unit and the recovery unit is comparatively low, the invention provides a low-complexity way of continuing to use previously customary standard analogue interfaces and still achieving a high signal quality. A further advantage of the inventive recovery unit is the only very short time delay it causes for the processing of the signals.

In modern radio systems with high data transmission rates, pulse-shaping filters are used which allow the transmission bandwidth of the transmitted signals to be reduced. This makes it possible to use the transmission capacity of the transmission medium to the greatest possible extent. However, the pulse shaping for the transmitted signals also entails unwanted intersymbol interference (ISI). To be able to remove this intersymbol interference from the analogue baseband signals, the recovery unit preferably has an equalizer. In principle, equalization involves raising frequency components which guarantee freedom from ISI. In addition, the equalization makes the symbol clock visible in the spectrum of useful signals.

Equalizing the digitized baseband signals has been found to be particularly advantageous for EDGE modulated baseband signals, since otherwise the massive intersymbol interference caused by the unit pulse defined in the EDGE standard would allow no meaningful reconstruction of the symbol transitions.

In line with one advantageous refinement of the inventive radio-frequency IC, the equalizer is in the form of a digital FIR (Finite Impulse Response) filter. To be able to reconstruct the data information on which the pulse-shaped baseband signals are based as accurately as possible, the filter coefficients of the FIR filter are tuned to the unit pulse used for pulse shaping in the baseband IC.

The equalizer preferably has a demodulator connected downstream of it which is used to demodulate the baseband signals in order to obtain the determined data information from them.

Although the baseband signals do not need to be traced back to bit level, this may be the case, so that fresh modulation then needs to be performed. For this purpose, one preferred refinement of the inventive radio-frequency IC provides for the transmitted signal path to contain a digital modulator arranged downstream of the recovery unit.

If the baseband signals have been pulse-shaped in the baseband IC, this pulse shaping is eliminated by the inventive processing of the baseband signals in the radio-frequency IC. To restore the pulse shaping of the signals, the radio-frequency IC contains a pulse-shaping filter connected into the transmitted signal path. The pulse-shaping filter is arranged in the transmitted signal path particularly downstream of the recovery unit or downstream of the modulator.

In line with one particularly preferred refinement of the invention, the analogue baseband signals supplied to the input of the radio-frequency IC are phase-modulated and particularly conform to the EDGE (Enhanced Data Rates for GSM Evolution) standard. Preferably, the invention uses 8PSK modulation. 8PSK modulation in connection with the EDGE standard is described in section 3 of the specification 3GPP TS 45.004 V5.1.1 (2003-09).

If the baseband signals are phase-modulated, the recovery unit advantageously contains a converter unit for representing the baseband signals using polar coordinates.

The phase signals generated by the converter unit are preferably supplied to a phase decision element. The phase decision element uses the phase signals to ascertain the phase rotation between two respective successive symbols from which the analogue baseband signals have been produced, for example. In one alternative refinement of the phase decision element, the phase signals are used to infer the phase states from which the analogue baseband signals have been produced.

So that the phase decision element can make a decision regarding the phase rotation or the phase state at the correct times, the symbol clock on which the analogue baseband signals are based needs to be recovered. This is the task of a synchronization unit, which ascertains the symbol clock using the absolute-value signals generated by the converter unit. The symbol clock obtained in this way is supplied to the phase decision element.

The inventive mobile radio transmitter comprises a baseband IC and a radio-frequency IC. The baseband IC produces analogue baseband signals, which the radio-frequency IC accepts at its input. Since the radio-frequency IC in the mobile radio transmitter is designed in accordance with the invention, the inventive mobile radio transmitter has the same advantages over conventional mobile radio transmitters as the inventive radio-frequency IC.

BRIEF DESCRIPTION OF THE DRAWINGS

The invention is explained in more detail below by way of example with reference to the drawings, in which.

DETAILED DESCRIPTION

Figure 1:
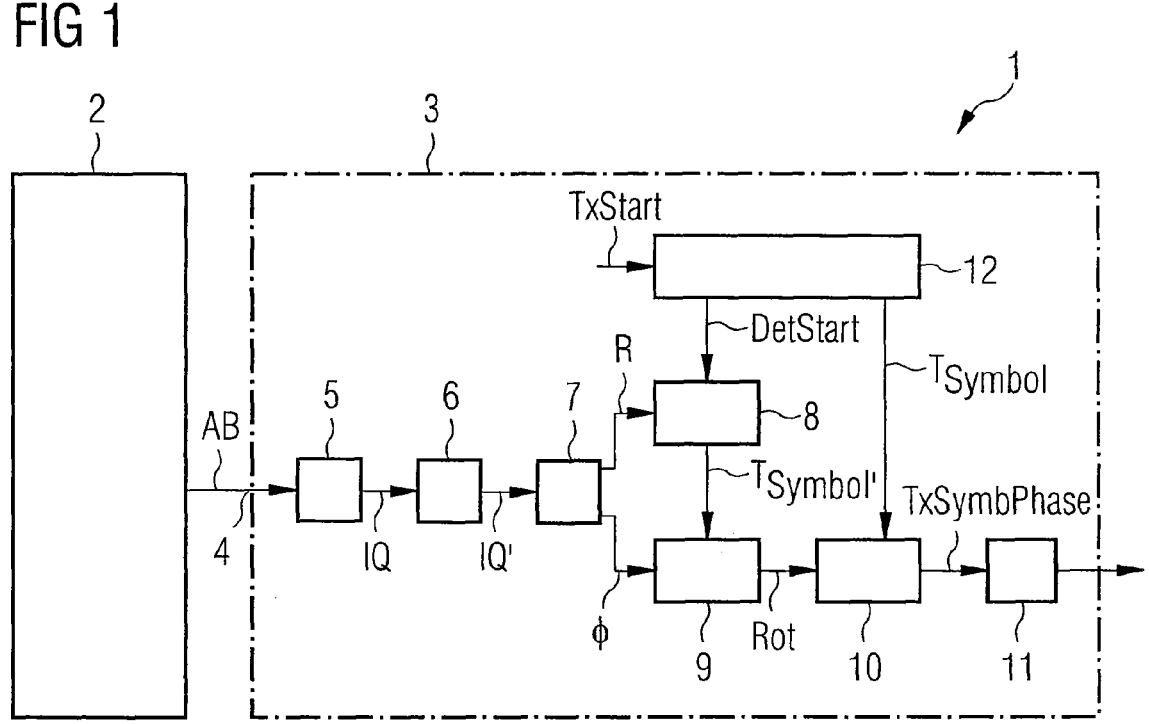
FIG. 1 shows a block diagram of a mobile radio transmitter with a radio-frequency IC as an exemplary embodiment of the invention.

FIG. 1 shows the block diagram of a mobile radio transmitter 1. The mobile radio transmitter 1 essentially comprises a baseband IC 2 and a radio-frequency IC 3. The baseband IC 2 produces analogue baseband signals, from which the radio frequency IC 3 produces transmitted signals using components which are explained further below. The transmitted signals are radiated by means of an antenna (not shown in FIG. 1).

The radio transmission brought about by means of the mobile radio transmitter 1 is based on the EDGE standard, with the transmitted signals being 8PSK-modulated. The 8PSK modulation method is an 8-value modulation method in which three successive bits of the data stream to be transmitted are respectively mapped onto a complex symbol. In this case, a complex symbol of this type forms a point on the circle of unit radius in the complex number plane. In this case, the real part corresponds to the inphase component (I component for short) and the imaginary part corresponds to the quadratur component (Q component for short). Mathematically, a symbol $s_i$ produced in this manner can be represented as follows, where $1 \in \{0, 1, 2, \ldots, 8\}$ is the "symbol parameter":

$$s_i = e^{j2\pi l/8} \tag{1}$$

In the EDGE standard, the customary 8PSK modulation is supplemented by the particular feature that the symbols $s_i$, having been produced, are rotated continuously about an angle of $3\pi/8$. Accordingly, the following applies for the rotated symbols $\hat{s}_i$:

$$\hat{s}_i = s_i \cdot e^{ji3\pi/8} \tag{2}$$

Figure 2:
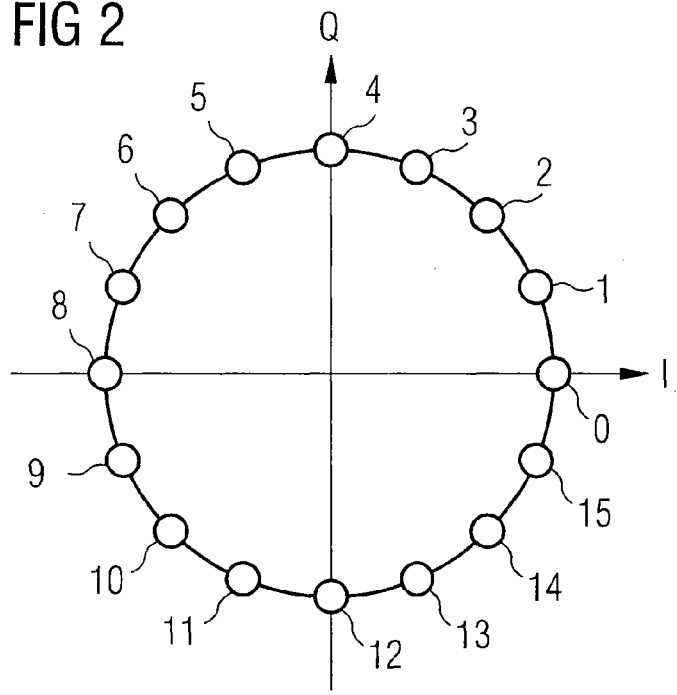
FIG. 2 shows a representation of the possible phase states for an EDGE transmission using 8PSK modulation.

The rotated symbols $\hat{s}_i$ can therefore assume various states in the complex number plane, sixteen said states respectively being rotated through an angle of $\pi/8$ with respect to one another. The resultant states on the complex circle of unit radius are shown in FIG. 2. The symbol phase $\phi_i$ in this case is calculated as follows (where $i \in [,15]$):

$$\phi_i = e^{ji\pi/8} \tag{3}$$

The rotated symbols $\hat{s}_i$ are subjected to EDGE specific pulse shaping in the baseband IC 2 and are converted into analogue IQ signals. These baseband signals are provided as analogue difference signals AB at the output of the baseband IC 2.

The radio-frequency IC 3 accepts the analogue difference signals AB of the IQ signals at an input 4. They are then sampled by an analogue/digital converter 5. The digital IQ signals IQ obtained in this way are supplied to an FIR filter 6 used as a static equalizer. It is the task of the FIR filter 6 to remove the intersymbol interference, caused by the pulse shaping with the EDGE unit pulse in the baseband IC 2, from the IQ signals IQ. To this end, the coefficients of the FIR filter 6 are tuned to the EDGE unit pulse. Following equalization, the equalized IQ signals IQ' are forwarded to a converter 7, which transforms the equalized IQ signals IQ' into their polar coordinates. In the polar coordinate representation, the equalized IQ signals IQ' are respectively characterized by their absolute-value R and their phase Φ.

The absolute-values R of the equalized IQ signals IQ' are supplied to a synchronization unit 8. The synchronization unit 8 is used to recover the symbol clock from the absolute-value profile of the equalized IQ signals IQ'. This is intended to find the time at which a symbol was sampled by the analogue/digital converter 5. For this purpose, it is appropriate to examine the absolute-value R of the IQ signals IQ', since—as can be seen from the state diagram shown in FIG. 2—the absolute-value R of all the symbols is the same and is ideally equal to 1. Accordingly, the synchronization unit 8 examines the absolute-value profile for a periodically recurring variable and, from this, ascertains the symbol clock $T_{symbol}'$, which is in phase with the IQ signal IQ.

The symbol clock $T_{symbol}'$ and the phase Φ of the equalized IQ signals IQ' are supplied to a phase decision element 9. Using the symbol clock $T_{symbol}'$ supplied to it, the phase decision element 9 can select the sampled phase value Φ which corresponds to a symbol. This prevents intermediate states between two successive symbols from being output as supposed symbols. The output of the phase decision element 9 outputs the rotation Rot between two respective successive phase states. Possible rotations Rot between two successive phase states are ±7, ±5, ±3 and ±1 on the basis of EDGE-specific signal production. These numbers indicate the steps which are required in the state diagram in FIG. 2 in order to get from one phase state to the next phase state.

The rotations Rot ascertained by the phase decision element 9 are forwarded to a conversion unit 10. The conversion unit 10 calculates the transmission phase sequence from the rotations Rot and outputs a succession of phase states TxSymbPhase. The phase states TxSymbPhase are then supplied to a pulse-shaping filter (not shown in FIG. 1) for pulse shaping with the EDGE unit pulse. The resultant digital signals are converted into analogue signals by an extremely digital modulator 11. The analogue signals are then subjected to the usually processing in a radio-frequency IC, i.e. they are amplified in a power amplifier, inter alia, and are radiated via the antenna.

The radio-frequency IC also contains a control unit 12 which is used to control the synchronization unit 8 and the phase decision element 10. The control signals produced by the control unit 12 are explained in more detail below in conjunction with FIG. 3.

Figure 3:
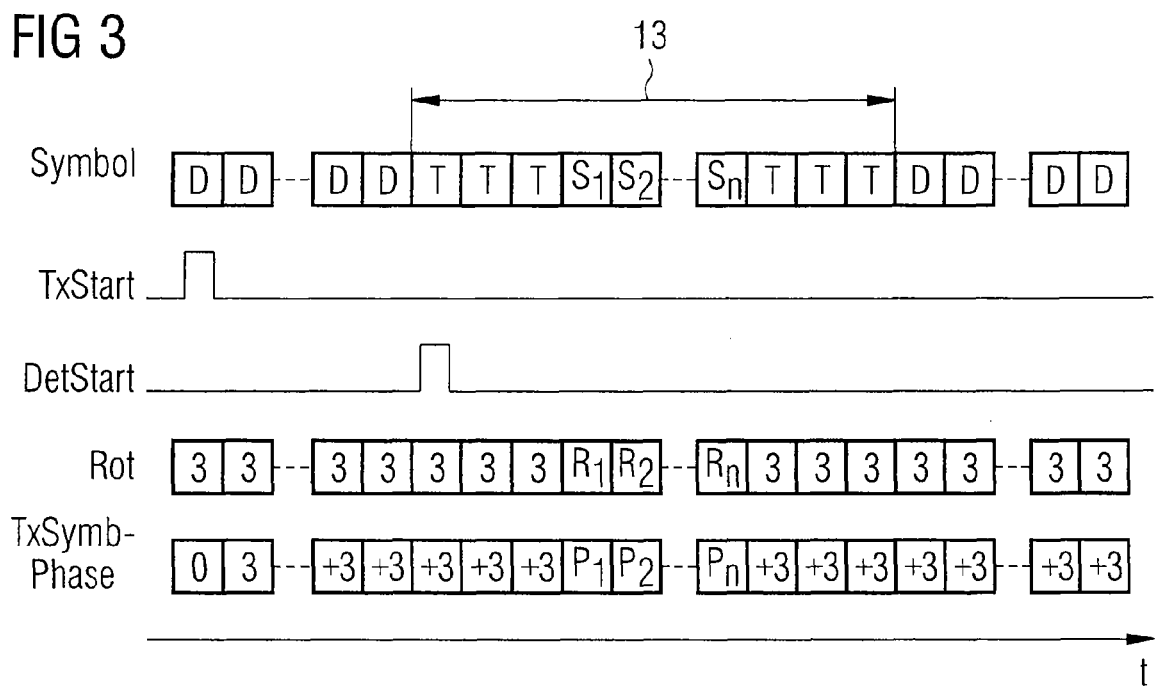
FIG. 3 shows a representation of the time response of various signals from the mobile radio transmitter shown in FIG. 1.

FIG. 3 plots the response of various signals processed or produced in the mobile radio transmitter 1 against time t. The top row of FIG. 3 shows the symbols the way they are produced in the baseband IC 2 in accordance with the EDGE standard. The symbols shown there form an EDGE data burst. The range identified by the reference symbol 13 indicates the usable range of the EDGE data burst. This comprises 3 initial "tail symbols" T, a number of useful data symbols $S_1$ to $S_n$, and 3 concluding tail symbols T. The usable range 13 is enclosed by a number of dummy symbols D.

The second row of FIG. 3 shows a signal TxStart. The signal TxStart is generated by the baseband IC 2 and notifies the radio-frequency IC 3 and particularly the control unit 12 of the starting time of an EDGE data burst. Using the signal TxStart, the control unit 12 generates a control signal DetStart, which is shown in the third row of FIG. 3 and which controls the synchronization unit 8. The control signal DetStart is used to inform the synchronization unit 8 of the time at which the usable range 13 of the EDGE data burst starts.

In addition, the control unit 12 produces a symbol clock $T_{symbol}$, which has an arbitrary but constant phase relative to the symbol clock $T_{symbol}'$ and which is used to control the output of the phase states TxSymbPhase from the conversion unit 10.

The fourth and fifth rows of FIG. 3 show the output signals from the phase decision element 9 and from the conversion unit 10. In this case, $R_1$ to $R_n$ denote the rotations Rot between two respective successive detected symbols in the π/8 resolution. The rotations $R_1$ to $R_n$ have been obtained from the symbols $S_1$ to $S_n$ and from the additional 3π/8 rotation in accordance with equation (2).

The reference symbols $P_1$ to $P_n$ indicate the phase states TxSymbPhase in the π/8 resolution. The phase states $P_1$ to $P_n$ are likewise determined by the symbols $S_1$ to $S_n$ and the additional 3π/8 rotation in accordance with equation (2). On the basis of FIG. 3, the phase states $P_1$ to $P_n$ also have the 3π/8 rotation. This rotation does not necessarily need to be removed within the context of the invention. To calculate the phase states TxSymbPhase, the rotations Rot are converted to a succession of phase states TxSymbPhase which starts with any desired initial phase. In this case, a phase state TxSymbPhase is calculated from the summation of the rotation succession and the addition of the initial phase.

When calculating the phase states TxSymbPhase using the conversion unit 10, it should be noted that valid phase states TxSymbPhase need to be provided right from the first dummy symbol D in the EDGE data burst. The fact that the EDGE data burst has a known starting sequence comprising the dummy symbols D and tail symbols T means that valid phase states can be generated and forwarded to the digital modulator even before the actual state reconstruction. The result of this is that the processing time is shortened.

What is claimed is:

1. A Radio-frequency IC for a mobile radio transmitter, comprising
   an input for receiving analogue baseband signals that are phase-modulated and particularly conform to the EDGE standard,
   an analogue/digital converter unit for analogue/digital conversion of the analogue baseband signals,
   a recovery unit, connected downstream of the analogue/digital converter unit, for recovering determined data information on which the analogue baseband signals are based, the recovery unit comprising:
   a converter unit for representing the digital baseband signals using polar coordinates, and
   a phase decision element which uses the phase signals obtained from the converter unit for the digital baseband signals to determine the phase rotations between two respective successive symbols from which the analogue baseband signals are produced or the succession of phase states from which the analogue baseband signals are produced, and
   a unit for producing analogue transmitted signals using the determined data information.

2. A Radio-frequency IC according to claim 1, wherein the analogue baseband signals supplied to the input of the radio-frequency IC are in pulse-shaped form, and
   the recovery unit has an equalizer for equalizing the digital baseband signals.

3. A Radio-frequency IC according to claim 2, wherein the equalizer is in the form of a digital FIR filter.

4. A Radio-frequency IC according to claim 3, wherein the filter coefficients of the FIR filter are tuned to the pulse shaping of the analogue baseband signals.

5. A Radio-frequency IC according to claim 1, wherein the recovery unit comprises a demodulator for demodulating the digital baseband signals, the demodulator being connected downstream of the equalizer, in particular.

6. A Radio-frequency IC according to claim 1, wherein a modulator is connected into the transmitted signal path of the radio-frequency IC, the modulator being arranged in the transmitted signal path downstream of the recovery unit.

7. A Radio-frequency IC according to claim 6, wherein a pulse-shaping filter is connected into the transmitted signal path of the radio-frequency IC, the pulse-shaping filter being arranged in the transmitted signal path downstream of the recovery unit or downstream of the modulator.

8. A Radio-frequency IC according to claim 1, wherein the recovery unit comprises a synchronization unit which uses the absolute-value signals obtained from the converter unit to control the phase decision element.

9. A Radio-frequency IC according to claim 8, wherein the synchronization unit controls the phase decision element by supplying it with a symbol clock which indicates to the phase decision element the time at which a phase signal which can be used for further evaluation is present.

10. A Mobile radio transmitter having a baseband IC and a radio-frequency IC according to claim 1, wherein the baseband IC produces the analogue baseband signals which the radio-frequency IC receives at its input.

11. A Radio-frequency IC for a mobile radio transmitter, comprising
- an input receiving analogue baseband signals that are in pulse-shaped form,
- an analogue/digital converter unit coupled with said input,
- a recovery unit connected downstream of the analogue/digital converter unit, the recovery unit comprising:
  - an equalizer for equalizing the digital baseband signals,
  - a converter unit coupled with said equalizer for representing the digital baseband signals using polar coordinates, and
  - a phase decision element which uses the phase signals obtained from the converter unit for the digital baseband signals to determine the phase rotations between two respective successive symbols from which the analogue baseband signals have been produced or the succession of phase states from which the analogue baseband signals have been produced, and
- a unit coupled to said recovery unit operable to produce analogue transmitted signals.

12. A Radio-frequency IC according to claim 11, wherein
the equalizer is in the form of a digital FIR filter, and
the filter coefficients of the FIR filter are tuned to the pulse shaping of the analogue baseband signals.

13. A Radio-frequency IC according to claim 11, wherein a modulator is connected into the transmitted signal path of the radio-frequency IC, the modulator being arranged in the transmitted signal path downstream of the recovery unit.

14. A Radio-frequency IC according to claim 13, wherein a pulse-shaping filter is connected into the transmitted signal path of the radio-frequency IC, the pulse-shaping filter being arranged in the transmitted signal path downstream of the recovery unit or downstream of the modulator.

15. A Radio-frequency IC according to claim 11, wherein the analogue baseband signals supplied to the input of the radio-frequency IC are phase-modulated and particularly conform to the EDGE standard.

* * * * *